Patented Aug. 17, 1948

2,447,176

UNITED STATES PATENT OFFICE 2,447,176

GUANAMINE COMPOUNDS

Adolf Grün, deceased, late of Basel, Switzerland, by Franz Grün, administrator, Basel, Switzerland, assignor to J. R. Geigy A. G., Basel, Switzerland No Drawing. Application February 9, 1948, Serial No. 7,292. In Switzerland April 25, 1939

2 Claims. (Cl. 260—249.5)

The present application is concerned, more particularly, with those triazino compounds (2-substituted guanamines) which having the following formula

R—G in which R is a carboxy polymethylene radical and G is a guanamino radical having a free valence on the carbon atom of the triazino ring which does not have an amino group attached to it, the bond between R and G being a carbon to carbon bond. Illustrative compounds of this character are inter alia the following: β-carboxypropionoguanamine, ω-carboxy pelargonoguanamine and the like.

The invention is based upon the observation that, contrary to expectations in view of the prior art experiences with this type of compound, it is possible to obtain the aforesaid 2-substituted guanamines, which may also be regarded as 2:4-diamino-1:3:5-triazino compounds, very readily and in smooth manner by the reaction under suitable conditions between biguanide and the corresponding carboxylic acid halide. In this connection, it is preferred to carry out the reaction in a medium containing a non-caustic acid-binding agent.

The compounds of the present invention may serve as intermediate products for the manufacture of medicinal and therapeutic substances and dyestuffs, as well as textile assistants, softening agents, etc.

The present application is in part a continuation of copending application S. N. 434,624, filed March 13, 1942, and entitled "Manufacture of 2:4-diamino-1:3:5-triazines", now Patent No. 2,437,691, issued March 16, 1948. The appended claims correspond to claims 19 and 20, respectively, of the last-named application.

The invention is illustrated, but not limited, by the following examples, the parts being by weight except as otherwise indicated.

Example 1

11 parts of biguanide are dissolved in 400 parts of toluene, 12 parts of anhydrous soda (sodium carbonate) are added and gradually combined, while stirring at 50–60° C., with 15 parts of β-carbomethoxy propionyl chloride dissolved in the same quantity of toluene. The temperature is raised gradually to and then maintained for 16 hours at 110° C., after which it is allowed to drop to 80° C. The solution is filtered off from the salt residue and concentrated in vacuo. The resulting product is β-carboxy-propiono-guanamine

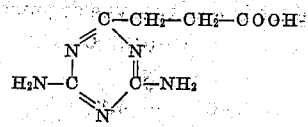

and is colorless and infusible.

Example 2

To 353 parts of biguanide dissolved in 2500 parts of methanol containing 162 parts of sodium methoxide were added 462 parts of sodium methyl succinate. This reaction mixture was stirred for about one day even though precipitation appeared to be completed in about five to six hours. The insoluble product was removed by filtration and the methanol was concentrated to yield further product. This crude sodium β-carboxypropionoguanamine amounting to about 425 parts was dissolved in water, filtered in order to remove the small amount of insoluble material and then acidified to a pH of about 4.0. The precipitated β-carboxypropionoguanamine

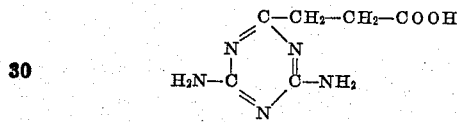

was filtered, washed with a large volume of water and then dried at 110° C. The yield of colorless and infusible product was 332 parts.

Example 3

209 parts of ethyl succinate were added to 101 parts of biguanide dissolved in 400 parts of warm methanol. Within a few minutes the product began to precipitate from the solution and after standing overnight the product was filtered and washed with methanol. This material was then extracted with about 300 parts of hot ethanol, which dissolved the β-carbomethoxypropionoguanamine

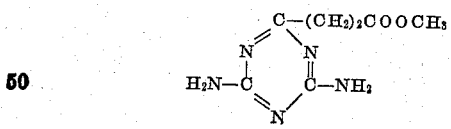

melting at 159° C. The residue left from the alcohol extraction was succinoguanamine

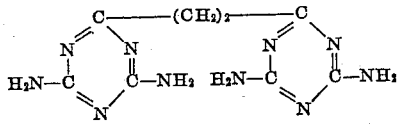

melting about 335° C., which could be further purified by dissolving in warm dilute hydrochloric acid solution, followed by precipitation with ammonium hydroxide. When the amount of biguanide was doubled the succinoguanamine was obtained in about 75% yield and the monoguanamine was absent.

Example 4

11 parts of biguanide are dissolved in 400 parts of toluene, 12 parts of anhydrous soda (sodium carbonate) are added and gradually combined, while stirring at 50–60° C., with 22 parts of ω-carbomethoxypelargonyl chloride dissolved in the same quantity of toluene. The temperature is raised gradually to and then maintained for 16 hours at 110° C., after which it is allowed to drop to 80° C. The solution is filtered off from the salt residue and concentrated in vacuo. The resulting product is ω-carboxypelargonoguanamine

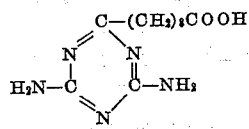

and has a melting point of 223–225° C.

Example 5

100 parts of biguanide were added to 280 parts of sodium butyl sebacate dispersed in about 1200 parts of methanol warmed to about 55–60° C. The reaction mixture was stirred at room temperature for about 24 hours. After filtering and washing with methanol, the sodium salt was dissolved in about 2500 parts of water, and filtered hot. The filtrate was acidified to a pH of about 4.0 and the precipitated ω-carboxypelargonoguanamine

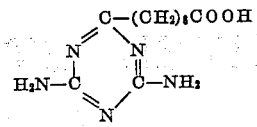

was extracted with alcohol in order to remove any sebacic acid. The yield of purified product melting at 223–225° C. was 75%.

Having thus disclosed the invention, what is claimed is:

1. Guanamines having the following formula:

in which R is a carboxy polymethylene radical and G is a guanamine radical having a free valence on the carbon atom of the triazine ring which does not have an amino group attached to it, the bond between R and G being a carbon to carbon bond.

2. Guanamines having the following formula

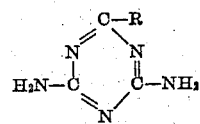

in which R is a carboxy polymethylene radical, the bond between R and C being carbon to carbon bond.

FRANZ GRÜN,
*Administrator of the Estate of Adolf Grün, Deceased.*